United States Patent Office 2,814,335
Patented Nov. 26, 1957

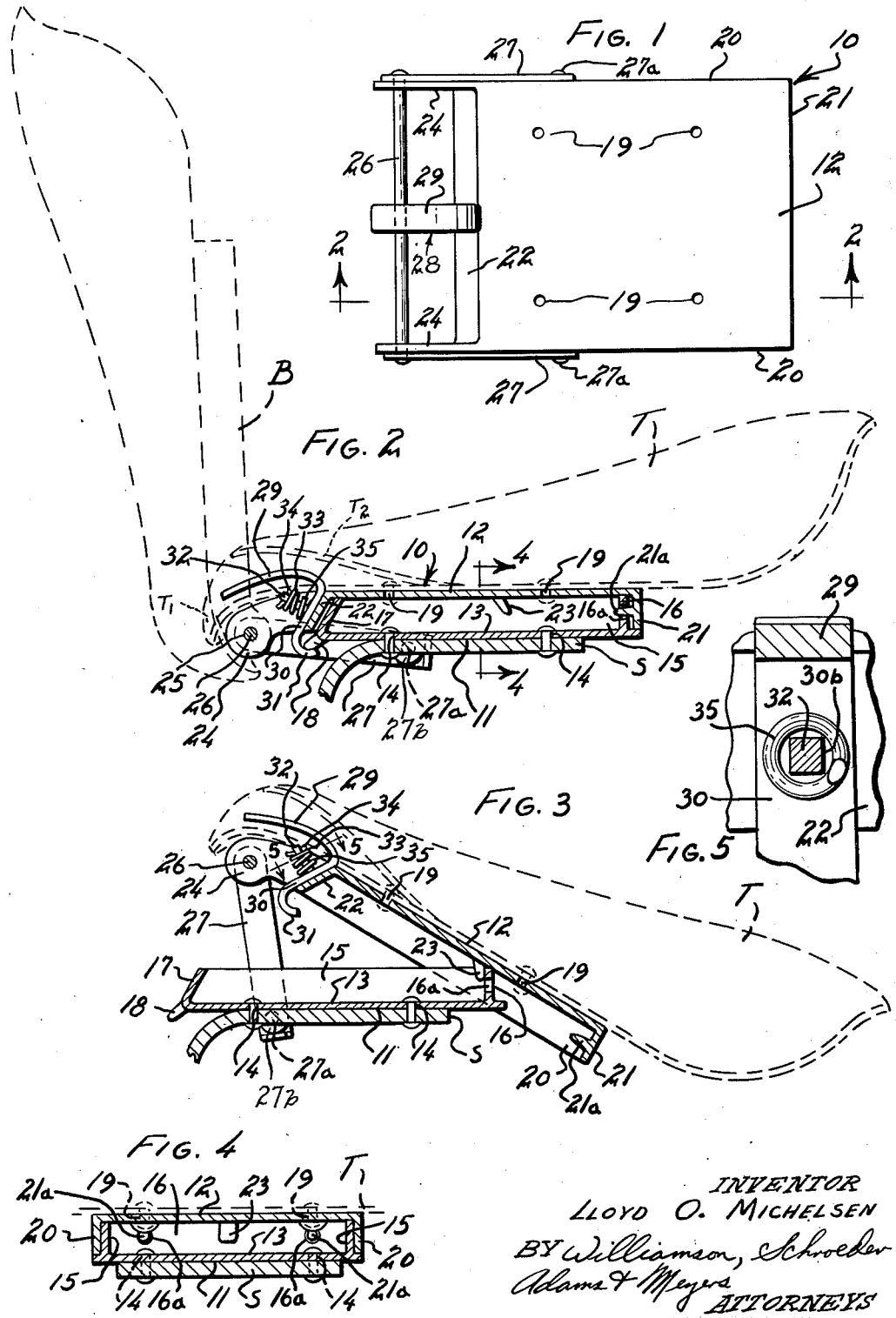

2,814,335

TRACTOR SEAT MOUNTING

Lloyd O. Michelsen, Clinton, Minn.

Application March 2, 1955, Serial No. 491,582

8 Claims. (Cl. 155—51)

This invention relates to implement accessories and more specifically relates to a seat mounting for tractors and the like.

The operator of an implement such as a tractor often times finds it necessary to stand up in order to more easily observe the operation of his implement and in order to properly control it. In many types of such implements the seat is disposed in such close relation to other apparatus of the implement, such as the steering wheel, that standing up is both difficult and uncomfortable. Although some seat mountings have been developed in the past to permit the seat to be swung or shifted to a position wherein the operator may easily and comfortably stand up, such seat mountings have had distinct disadvantages. One of the most important of these disadvantages is that when such mountings with the seat thereon are swung out of the way, they move to an inaccessible location so that when the operator desires to sit down again, he must divert his attention from the operation of the implement to reach the seat and move it into position wherein he may sit down again.

An object of my invention is to provide an improved seat mounting of simple and inexpensive construction and operation for use on an implement such as a tractor.

Another object of my invention is the provision of a novel seat mounting of the class described which holds the seat in such a position while the operator stands up, so that he may again move it into a position wherein he may sit on it with a minimum of effort and without removing his attention from the operation of the implement.

Still another object of my invention is the provision of a new and improved tractor seat mounting of the class described, which, when the seat has been shifted to an out of the way position, holds the seat in a position wherein the operator may, without use of his hands, sit down on the seat to bring it back into proper position for supporting him and which mounting will thereafter latch the seat in such a position.

A further object of my invention is the provision of a tractor seat mounting for shifting a seat into an out of the way but convenient position and which mounting provides a latch which may be operated with a minimum of effort without requiring that the operator divert his attention from the operation of the implement.

These and other objects and advantages of my invention will more fully appear from the following description made in connection with the accompanying drawings wherein like reference characters refer to the same or similar parts throughout the several views and in which:

Fig. 1 is a plan view of my invention shown in closed relation;

Fig. 2 is a section view taken on a vertical plane substantially at 2—2 of Fig. 1;

Fig. 3 is a view substantially identical to that shown in Fig. 2, and having a portion of the invention in shifted position; and Fig. 4 is a section view taken on a vertical plane substantially at 4—4 of Fig. 2.

Fig. 5 is a detail section view taken substantially at 5—5 of Fig. 3.

The seat mounting which is designated in general by numeral 10 is comprised of a frame element or support member 11 and a mounting plate or attachment element 12 which is interconnected to the frame element 11 for shifting movement with respect thereto. Frame element 11 constitutes a rigid plate 13 which may be constructed of sheet metal and which is provided with a plurality of apertures 14 therein for receiving bolts or rivets therethrough for fixedly securing the same to the seat support S of the implement, which in the form shown, comprises a leaf spring. Frame element 11 is also provided with upstanding side walls 15, an upstanding rear wall 16 and a front wall 17, the upper edges of all of said walls lying substantially in a plane. A portion of the rear wall 16 comprises a stop member or abutment. Front wall 17 is disposed at an acute angle with the bottom plate 13 and is thereby disposed in an inclined position. At the forward end portion of frame element 11 and substantially at the juncture between plate 13 and front wall 17, a short lip or keeper element 18 is fixedly secured, which keeper depends from frame element 11 in a forwardly inclined position.

Mounting plate 12 is normally supported in substantially parallel and spaced relation above plate 13 of frame element 11 and is also provided with a plurality of apertures 19 therein for receiving bolts which may securely affix a tractor seat T thereto. It should be understood that tractor seat T is of conventional construction, and in the form shown, has a contour design. At opposite sides of the forward portion of the seat are provided leg-receiving recesses or pockets as indicated at $T_1$, and approximately midway across the width of the forward portion is provided a rounded and upwardly projecting insert portion, indicated at $T_2$, which is receivable into a person's crotch as he sits on the seat. The front edge of the seat is contoured in a similar manner. The tractor seat T will be mounted wherein the front edge thereof extends slightly forwardly of the forward end portion of mounting plate 12 and wherein the enlarged rear portion of seat T is disposed rearwardly of mounting plate 12. Mounting plate 12 is provided with depending side walls 20 which are disposed slightly outwardly of side walls 15 of frame element 11 and is also provided with a rear wall 21 which is also disposed outwardly of the corresponding rear wall 16 of frame element 11, and is also provided with an inclined front wall 22 which extends substantially parallel to front wall 17 of frame element 11 and on the outside thereof. It should be noted that frame element 11 and attachment element 12 essentially comprise trays which are nested together so as to define an enclosed box.

A short lip or lug 23 is affixed on mounting plate 12 in depending relation therefrom and is disposed at an acute angle with plate 12 and in spaced relation with the stop member 16. Lug 23 is shiftable with mounting plate 12 into engagement with abutment 16.

A pair of studs 21a are fixed to the rear wall of mounting plate 12 and are adapted to extend through corresponding apertures 16a in the rear wall 16 of the frame element 11.

A pair of forwardly extending arms 24 are affixed to mounting plate 12 and are provided with aligned trunnion bearings 25 therein for mounting pivot shaft 26 therein which extends transversely across mounting plate 12 and slightly outwardly therefrom. The outer ends of shaft 26 provide trunnion means.

A pair of interconnecting links 27 are respectively disposed on opposite sides of frame element 11 adjacent the front end portion thereof. Links 27 are swingably mounted on depending ears 27b which are formed integrally of frame element 11 and between the end portions thereof. Links 27 swing in vertical planes and normally extend forwardly into proximity with arms 24 of mounting plate 12. Links 27 are also swingably mounted on the opposite ends of shaft 26.

Latching mechanism is interposed between mounting plate 12 and frame element 11 and, in the form shown, comprises a latch element 28 having an elongated finger or lever portion 29 which extends below the tractor seat T and substantially to the forward edge thereof at the insert portion $T_2$. Latch element also includes a central body portion 30 which extends transversely and downwardly of front wall 22 of attachment element 12 and also includes a hook portion 31 disposed adjacent keeper 18 for hooking over the bottom edge thereof.

A square and elongated stub shaft 32 is affixed to the front wall 22 of mounting plate 12 and is slidably received in a corresponding square aperture 30b in the central body portion 30 of latch element 28. Latch member 28 is precluded from turning about shaft 32 and will be maintained in operative position. A retaining element such as a washer 33 is mounted adjacent the outer end of shaft 32 and is retained thereon by suitable means such as pin 34. A compression spring 35 is interposed between the body portion 30 of latch 28 and retaining element 33 and in surrounding relation with stub shaft 32 for resiliently urging latch element 28 into engagement with the front wall 22 of mounting plate 12.

In operation, the seat mounting 10 will normally retain the seat T in a position to permit the operator of the implement to sit thereon and be adequately supported thereby. The latch mechanism and studs 21a will maintain the seat T in such a position and will preclude shifting thereof. When the operator desires to stand up, he need merely reach down between his legs and below the front edge of the seat T, lift upwardly on the forwardly extending finger portion 29 of latch element 28, whereupon latch element 28 will pivot substantially at the upper edge of the front wall 22 of mounting plate 12 to forwardly shift hook portion 31 and disengage the same from keeper 18. When the latch mechanism has in this manner released the seat for movement, the operator need merely pull upwardly as he stands up to cause the mounting plate 12 and seat T to shift relative to frame element 11. The forward end portion of mounting plate 12 will shift upwardly as links 27 swing upwardly about their rear pivots 27a. Because the respective front walls 17 and 22 of frame element 11 and mounting plate 12 are both inclined, there will be no jamming or binding of these front walls as the mounting plate 12 shifts upwardly. Front wall 22 will swing clear of the other front wall 17. Simultaneously with the upward shifting of the forward portion of mounting plate 12, the rear portion thereof will begin to slide in a rearward direction on the rear wall 16 of frame element 11, and as upward shifting of the front portion of mounting plate 12 and seat T continues, lug 23 will slide with mounting plate 12 into engagement with the stop member 16 of frame element 11 which will preclude further shifting of mounting plate 12 and seat T. This rearwardly shifted position of seat T is best shown in Fig. 3. It should be noted that the main portion of the seat T is disposed rearwardly of lug 23 and therefore, when the seat and mounting plate 12 are shifted into their rearward position, they will remain in that position until again brought forwardly by application of pressure thereto. Lug 23 is disposed, when in rearwardly shifted position, in substantially parallel alignment with rear wall 16 of frame element 11 and thereby engages a maximum of area thereof.

After the seat has been shifted to its rearward and out of the way position, the front edge of seat T is still disposed in sufficiently close relation with the body of the operator of the implement that he need merely sit down or place the weight of his body against seat T adjacent the forward edge thereof to again bring the seat down into normal position wherein he may sit on it and be supported thereby. It is not necessary for him to remove his hands from the controls of the implement or divert his attention from the operation of the implement to bring the seat back into proper position for him to sit on it. As the forward end portion of mounting plate 12 is shifted downwardly toward frame element 11, the hook portion 31 of latch element 28 will shift over the keeper 18 and will engage the same to latch the seat in downwardly shifted position until the forwardly extending finger portion of latch element 28 is again shifted upwardly to unlatch the hook.

When the implement is not in use, the seat T and mounting plate 12 may be swung upwardly about shaft 26 into a substantially vertical position, as indicated by dotted position B to rest against the steering wheel or other apparatus of the implement so as to preclude rain from collecting in seat T. When the seat is thereafter swung downwardly the latch will retain the seat in its normal position again until the seat is to be shifted rearwardly or swung upwardly again.

It will be seen that I have provided a new and improved tractor seat mounting which is adapted to support the tractor seat in its normal poistion for supporting the operator of the tractor and which is also adapted to shift the seat into and retain the same in, an out of the way but conveniently disposed location wherein the operator subsequently need merely sit on the seat to bring it back into position for supporting him.

It will, of course, be understood that various changes may be made in the form, detail, arrangement and proportion of the parts without departing from the scope of my invention which consists of the matter described herein and set forth in the appended claims.

What is claimed is:

1. A seat mounting for use with an implement having a seat support, and comprising a frame element having a rear end portion with an upstanding stop member thereon and also having a front end portion, said frame element being adapted to be mounted on such a seat support in a generally horizontal position, a mounting plate mounted in opposed and spaced relation above said frame element and being adapted to be secured to such a seat for supporting the same, means interposed between said frame element and said mounting plate to maintain the same in spaced relation and to permit relative sliding movement thereof, a pair of connecting links respectively disposed on opposite sides of said frame element and being swingably mounted thereon intermediate of said end portions thereof for movement in vertical planes and said links normally extending toward the front end portion of said frame element, said links also being swingably connected to said mounting plate adjacent the front end portion of said frame element, a rigid lug affixed to said plate and depending therefrom forwardly of and in spaced relation with said stop member, said mounting plate being slidable with respect to the rear end portion of said frame element and being shiftable upwardly and rearwardly adjacent the front end portion of said frame element for shifting such a seat into an out of the way position, said lug engaging said stop member when said mounting plate is shifted rearwardly of said frame element, whereby when the mounting plate and seat have been shifted to an out of the way position, the implement operator needs only to sit on the seat to again shift it forwardly and downwardly into position for supporting him.

2. In combination with a seat for an implement having a seat support, a frame element adapted to be mounted on such a seat support in a generally horizontal position and having a rear end portion with an abutment thereon and also having a front end portion, said seat being supported in a generally horizontal position on said frame element and having its front and rear ends respectively disposed adjacent the front and rear end portions of said frame element, a connecting link swingably mounted on said frame element for vertical movement and also swingably connected with said seat adjacent the front end thereof, and a lug fixedly connected with said seat and depending therefrom forwardly of said abutment and in alignment therewith relative to the direction of rearward movement of said seat for engaging said abutment when the front end of the seat is swung upwardly and rearwardly, and the rear end of the seat is slidably moved rearwardly of the rear end portion of said frame element, whereby the seat will be held in a convenient but out-of-the-way position.

3. The structure recited in claim 1 and including a keeper element and a releasable latch, one mounted on said frame element and the other being mounted on said seat for restricting movement thereof, and said latch having a shiftable lever extending forwardly and outwardly of said frame element to be disposed below the front end of said seat for operating said latch.

4. In apparatus for permitting the operator of an implement having a seat support to conveniently stand up or sit down, the combination of a frame element adapted to be mounted on such a support in a generally horizontal position and said frame element having opposite end portions, a seat supported in generally horizontal position on said frame element, said frame element having a stop member thereon adjacent one end portion thereof, a connecting link swingably connected adjacent the other end of said frame element with said seat and also swingably connected to said frame element to permit shifting of said seat relative to said frame element and toward said stop member, and a lug fixedly connected with said seat and depending therefrom in spaced relation with said stop member for engaging the same when said seat is shifted, whereby said seat may be shifted to and retained in an out-of-the-way, but convenient position.

5. A seat mounting for use with an implement having a seat support and comprising an elongated frame element having a rear end portion and having a front end portion, said frame element being adapted to be mounted on such a support in a generally horizontal position, a mounting plate mounted on said frame element and having a rear end portion slidably engaging the rear end portion of said frame element and having a front end portion, said mounting plate being adapted to be secured to such a seat, a pair of connecting links swingably connected to said frame element intermediate of the end portions thereof and to the front end portion of said mounting plate to permit upward and rearward shifting thereof relative to said frame element.

6. The structure recited in claim 5 wherein said mounting plate is adapted to carry such a seat in a position wherein the forward end of the seat is disposed forwardly of said frame element front portion and forwardly of said mounting plate, and including a releasable latch mounted on said mounting plate and having an elongated and shiftable lever adapted to operate said latch and extending forwardly of said mounting plate into proximity with and below the forward end of the seat, and a keeper element mounted on said frame element for cooperating with said latch in restricting relative movement of said mounting plate and said frame element.

7. A seat mounting for use on an implement having a seat support and comprising a mounting plate adapted to be fixedly secured to the bottom of such a seat and having a rear portion and also having a front portion with an inclined front wall extending downwardly therefrom and outwardly away from said rear portion, said wall having a lower edge, a frame element adapted to be secured to such a seat support and supporting said mounting plate, said frame element having an upstanding rear wall supporting the rear portion of said mounting plate and also having an upstanding and inclined front wall disposed substantially parallel to the front wall of said mounting plate and also disposed rearwardly thereof and engaging the mounting plate, a pair of connecting links respectively disposed on opposite sides of said frame element and being swingably connected thereto intermediate of the front and rear walls thereof and also being swingably connected to said mounting plate adjacent the front wall thereof, a latch element shiftably mounted on the front wall of said mounting plate and including a finger portion extending forwardly therefrom to be disposed beneath the front edge of the seat, said latch element also including a depending body portion extending below the lower edge of said mounting plate front wall and having a hook portion formed therein, resiliently yieldable means interposed between said mounting plate and said latch element for urging the body and hook portions thereof rearwardly, and a keeper element affixed to said frame element adjacent the front wall thereof for engaging the hook portion of said latch element and restricting upward movement of the same, whereby said finger portion of said latch element may be shifted to shift the hook portion thereof out of engagement with said keeper element for permitting upward and rearward shifting of said mounting plate and the seat thereon relative to said frame element.

8. A seat structure for use with an implement comprising a generally horizontally oriented frame element adapted for attachment to the implement and having a rear end portion, a seat supported in generally horizontal position on said frame element and being slidable over the rear end portion thereof, a connecting link having pivotal connection with said frame element and extending generally forwardly therefrom, said conecting link being swingably connected forwardly of said pivotal connection, to said seat, to facilitate rearward and forward movement of the seat and sliding thereof on the rear end portion of the frame element, a stop element secured to the frame element adjacent the rear end portion thereof, an abutment secured to the seat and spaced forwardly of said stop element and in alignment therewith relative to the direction of forward and rearward movement of the seat, whereby the stop element and abutment will retain the seat in a convenient and out-of-the-way position when shifted rearwardly.

References Cited in the file of this patent

UNITED STATES PATENTS

| | | |
|---|---|---|
| 418,747 | Prather | Jan. 7, 1890 |
| 2,534,386 | Stewart | Dec. 19, 1950 |
| 2,598,384 | Huber | May 27, 1952 |
| 2,604,927 | Bonnesen | July 29, 1952 |